(12) United States Patent
Schmitt et al.

(10) Patent No.: US 8,349,151 B2
(45) Date of Patent: Jan. 8, 2013

(54) UNIVERSAL CELL FRAME FOR HIGH-PRESSURE WATER ELECTROLYZER AND ELECTROLYZER INCLUDING THE SAME

(75) Inventors: Edwin W. Schmitt, Arlington, MA (US); Timothy J. Norman, Acton, MA (US)

(73) Assignee: Giner Electrochemical Systems, LLC, Newton, MA (US)

( * ) Notice: Subject to any disclaimer, the term of this patent is extended or adjusted under 35 U.S.C. 154(b) by 290 days.

(21) Appl. No.: 12/655,251

(22) Filed: Dec. 23, 2009

(65) Prior Publication Data

US 2010/0187102 A1 Jul. 29, 2010

Related U.S. Application Data

(60) Provisional application No. 61/203,544, filed on Dec. 23, 2008.

(51) Int. Cl.
*C25B 9/02* (2006.01)
(52) U.S. Cl. ......................................... 204/257; 204/279
(58) Field of Classification Search .................. 204/257, 204/279
See application file for complete search history.

(56) References Cited

U.S. PATENT DOCUMENTS

| | | | |
|---|---|---|---|
| 3,119,759 A * | 1/1964 | Hoover ........................ 204/212 |
| 5,009,968 A | 4/1991 | Guthrie et al. |
| 5,316,644 A | 5/1994 | Titterington et al. |
| 5,350,496 A | 9/1994 | Smith et al. |
| 6,057,053 A | 5/2000 | Gibb |
| 6,117,287 A * | 9/2000 | Molter et al. ................. 204/255 |
| 6,500,319 B2 | 12/2002 | LaConti et al. |
| 6,685,821 B2 | 2/2004 | Kosek et al. |
| 6,852,205 B1 * | 2/2005 | Toyoshima et al. ........... 204/288 |
| 7,229,534 B2 | 6/2007 | LaConti et al. |
| 7,261,967 B2 | 8/2007 | LaConti et al. |
| 7,438,985 B2 | 10/2008 | LaConti et al. |
| 7,824,527 B2 * | 11/2010 | Vandenborre ................. 204/279 |

* cited by examiner

*Primary Examiner* — Nicholas A. Smith
(74) *Attorney, Agent, or Firm* — Kriegsman & Kriegsman

(57) ABSTRACT

Universal cell frame generic for use as an anode frame and as a cathode frame in a water electrolyzer. According to one embodiment, the universal cell frame includes a unitary annular member having a central opening. Four trios of transverse openings are provided in the annular member, each trio being spaced apart by about 90 degrees. A plurality of internal radial passageways fluidly interconnect the central opening and each of the transverse openings of two diametrically-opposed trios of openings, the other two trios of openings lacking corresponding radial passageways. Sealing ribs are provided on the top and bottom surfaces of the annular member. The present invention is also directed at a water electrolyzer that includes two such cell frames, one being used as the anode frame and the other being used as the cathode frame, the cathode frame being rotated 90 degrees relative to the anode frame.

24 Claims, 8 Drawing Sheets

UNIVERSAL CELL FRAME FOR HIGH-PRESSURE WATER ELECTROLYZER AND ELECTROLYZER INCLUDING THE SAME

CROSS-REFERENCE TO RELATED APPLICATIONS

The present application claims the benefit under 35 U.S.C. 119(e) of U.S. Provisional Patent Application No. 61/203,544, filed Dec. 23, 2008, the disclosure of which is incorporated herein by reference.

STATEMENT REGARDING FEDERALLY SPONSORED RESEARCH OR DEVELOPMENT

The U.S. Government has a paid-up license in this invention and the right in limited circumstances to require the patent owner to license others on reasonable terms as provided for by the terms of Grant No. DE-FG02-06ER84537 awarded by the Department of Energy.

BACKGROUND OF THE INVENTION

The present invention relates generally to water electrolyzers and relates more particularly to a universal cell frame for a high-pressure (about 200 to 12,000 psi) water electrolyzer and to a water electrolyzer including said universal cell frame.

Water electrolysis is an important process for producing hydrogen, especially at remote sites, for electric generator cooling, materials processing, chemical reactions and laboratory use and analysis. Also, when low-cost power is available from renewable energy sources (e.g., wind, solar), water electrolyzers can cost-effectively and efficiently provide hydrogen, as an alternative to fossil fuels, for stationary and vehicular power applications.

Currently, two different water electrolysis technologies compete in the marketplace. The first and most developed technology is alkaline water electrolysis, in which the stack and cell electrolyte is liquid potassium hydroxide (KOH). The second technology is polymer electrolyte membrane (PEM) water electrolysis technology, which uses a solid proton-conductive membrane as the sole electrolyte in the system. PEM systems have significant advantages over alkaline electrolyzer systems for lightweight or high-pressure breathing or life-support applications, such as on board spacecraft and nuclear submarines. Some of the advantages of a PEM system include (1) superior performance at a given current density, (2) reliability (over 100,000 hours of highly invariant performance), (3) operational safety benefits of deionized-water system over a highly caustic system, and (4) a PEM system can effectively operate at high differential pressures of over 3,000 psi while liquid electrolyte alkaline systems are limited to differential pressures of inches of water.

In a typical PEM water electrolyzer, an anode is positioned along one face of a polymer electrolyte membrane, and a cathode is positioned along the opposite face of the polymer electrolyte membrane. To enhance electrolysis, a catalyst, such as platinum, is typically present both at the interface between the anode and the polymer electrolyte membrane and at the interface between the cathode and the polymer electrolyte membrane. The above-described combination of a polymer electrolyte membrane, an anode, a cathode and associated catalysts is commonly referred to in the art as a membrane electrode assembly.

In use, water is delivered to the anode and an electric potential is applied across the two electrodes, thereby causing the electrolyzed water molecules to be converted into protons, electrons and oxygen atoms. The protons migrate through the polymer electrolyte membrane and are reduced at the cathode to form molecular hydrogen. The oxygen atoms do not traverse the polymer electrolyte membrane and, instead, form molecular oxygen at the anode.

Often, a number of electrolysis cells are assembled together in order to meet hydrogen or oxygen production requirements. One common type of assembly is a stack comprising a plurality of stacked electrolysis cells that are electrically connected in series in a bipolar configuration. In one type of stack, each cell includes, in addition to a membrane electrode assembly of the type described above, a pair of multi-layer metal screens, one of said screens being in contact with the outer face of the anode and the other of said screens being in contact with the outer face of the cathode. The screens are used to conduct electrons to and from the cathode and anode and to form the membrane-supporting fluid cavities within a cell for the flow of water, hydrogen and oxygen. Each cell typically additionally includes a pair of polysulfone cell frames, each cell frame peripherally surrounding a set of screens. The frames are used to peripherally contain the fluids and to conduct the fluids into and out of the screen cavities. Each cell typically further includes a pair of metal foil separators, one of said separators being positioned against the outer face of the anode screen and the other of said separators being positioned against the outer face of the cathode screen. The separators serve to axially contain the fluids on the active areas of the cell assembly. In addition, the separators and screens together serve to conduct electricity from the anode of one cell to the cathode of its adjacent cell. Plastic gaskets may be used to seal the outer faces of the cell frames to the metal separators, the inner faces of the cell frames being sealed to the proton exchange membrane. The cells of the stack are typically compressed between a spring-loaded rigid top end plate and a bottom base plate. Electrically-conductive compression pads may be positioned between adjacent cells in a stack in order to maintain uniform contact pressure over the entire active areas of the electrodes.

Patents and publications relating generally to electrolysis cell stacks include the following, all of which are incorporated herein by reference: U.S. Pat. No. 7,438,985, inventors LaConti et al., issued Oct. 21, 2008; U.S. Pat. No. 7,261,967, inventors LaConti et al., issued Aug. 28, 2007; U.S. Pat. No. 7,229,534, inventors LaConti et al., issued Jun. 12, 2007; U.S. Pat. No. 6,685,821, inventors Kosek et al., issued Feb. 3, 2004; U.S. Pat. No. 6,500,319, inventors LaConti et al., issued Dec. 31, 2002; U.S. Pat. No. 6,057,053, inventor Gibb, issued May 2, 2000; U.S. Pat. No. 5,350,496, inventors Smith et al., issued Sep. 27, 1994; U.S. Pat. No. 5,316,644, inventors Titterington et al., issued May 31, 1994; U.S. Pat. No. 5,009,968, inventors Guthrie et al., issued Apr. 23, 1991; and Coker et al., "Industrial and Government Applications of SPE Fuel Cell and Electrolyzers," presented at The Case Western Symposium on "Membranes and Ionic and Electronic Conducting Polymer," May 17-19, 1982 (Cleveland, Ohio).

As noted above, cell frames are often utilized in electrolysis cells to conduct and to contain the cell operating fluids. Such cell frames are typically made of plastics like polysulfones that offer the advantages of chemical inertness and electrical resistance that are desirable and necessary in these cells.

Referring now to FIG. 1, there is shown a partially-exploded perspective view of a conventional PEM water electrolyzer (i.e., electrolysis cell), said conventional PEM water electrolyzer being represented generally by reference numeral 11. For the sake of simplicity, certain aspects of conventional PEM water electrolyzer 11 are neither shown nor discussed herein.

Electrolyzer 11 comprises a membrane electrode assembly 12, membrane electrode assembly 12 comprising a polymer electrolyte membrane (PEM) 13, an anode 14 positioned along one face of PEM 13, and a cathode 15 positioned along the opposite face of PEM 13. Electrolyzer 11 further comprises an anode screen 16 in contact with the outer face of anode 14, a cathode screen 17 in contact with the outer face of cathode 15, an anode separator 18 positioned against the outer face of anode screen 16, a cathode separator 19 positioned against the outer face of cathode screen 17, an anode frame 20, a cathode frame 21, an anode gasket 22, and a cathode gasket 23.

Anode frame 20, which is also shown separately in FIG. 2, comprises a unitary annular member 25, member 25 comprising an inner surface 27, an outer surface 29, a top surface 31, and a bottom surface 33. A pair of closely-spaced, substantially elliptical, transverse openings 35-1 and 35-2 are provided in member 25, each of openings 35-1 and 35-2 extending transversely from top surface 31 to bottom surface 33. In addition, a plurality of closely-spaced, substantially elliptical, transverse openings 35-3, 35-4 and 35-5 are provided in member 25, each of openings 35-3 through 35-5 extending transversely from top surface 31 to bottom surface 33. Openings 35-3, 35-4 and 35-5 are positioned in a substantially diametrically-opposed manner relative to openings 35-1 and 35-2, i.e., openings 35-3, 35-4 and 35-5 are positioned approximately 180 degrees away from openings 35-1 and 35-2. A plurality of radial passageways 37 are provided in member 25, each radial passageway 37 extending radially outwardly from inner surface 27 into fluid communication with one of openings 35-1 through 35-5. As shown, each of openings 35-1 through 35-5 has seven passageways 37 associated therewith.

A pair of substantially circular, transverse openings 39-1 and 39-2 are provided in member 25, each of openings 39-1 and 39-2 extending transversely from top surface 31 to bottom surface 33. Transverse openings 39-1 and 39-2 are positioned approximately 180 degrees away from one another. In addition, each of transverse openings 39-1 and 39-2 is positioned approximately 90 degrees away from openings 35-1 and 35-2 and approximately 90 degrees away from openings 35-3 through 35-5.

A pair of substantially circular, transverse openings 41-1 and 41-2 are provided in member 25, each of openings 41-1 and 41-2 extending transversely from top surface 31 to bottom surface 33. Openings 41-1 and 41-2 may be used to receive rods or similar hardware (not shown) to compress a plurality of electrolyzers 11 between a pair of plates (not shown).

A plurality of circumferential sealing ribs 51 for sealing with anode gasket 22 are provided on top surface 31 of member 25, ribs 51 being concentrically arranged in the space between inner surface 27 and openings 35-1 through 35-5, openings 39-1 and 39-2, and openings 41-1 and 41-2. Additional pluralities of concentric ribs for sealing with gasket 22 are provided on top surface 31 of member 25, said ribs consisting of ribs 53 surrounding opening 39-1, ribs 55 surrounding opening 39-2, ribs 57 surrounding both opening 35-1 and opening 35-2, and ribs 59 surrounding all three of openings 35-3 through 35-5. Corresponding pluralities of sealing ribs (not shown) are provided on bottom surface 33 of member 25.

Cathode frame 21, which is also shown separately in FIG. 3, comprises a unitary annular member 65, member 65 comprising an inner surface 67, an outer surface 69, a top surface 71, and a bottom surface 73. A pair of closely-spaced, substantially elliptical, transverse openings 75-1 and 75-2 are provided in member 65, each of openings 75-1 and 75-2 extending transversely from top surface 71 to bottom surface 73. In addition, a plurality of closely-spaced, substantially elliptical, transverse openings 75-3, 75-4 and 75-5 are provided in member 65, each of openings 75-3 through 75-5 extending transversely from top surface 71 to bottom surface 73. Openings 75-3, 75-4 and 75-5 are positioned in a substantially diametrically-opposed manner relative to openings 75-1 and 75-2, i.e., openings 75-3, 75-4 and 75-5 are positioned approximately 180 degrees away from openings 75-1 and 75-2.

A pair of substantially circular, transverse openings 79-1 and 79-2 are provided in member 65, each of openings 79-1 and 79-2 extending transversely from top surface 71 to bottom surface 73. Transverse openings 79-1 and 79-2 are positioned approximately 180 degrees away from one another. In addition, each of transverse openings 79-1 and 79-2 is positioned approximately 90 degrees away from openings 75-1 and 75-2 and approximately 90 degrees away from openings 75-3 through 75-5. A plurality of radial passageways 78 are provided in member 65, each radial passageway 78 extending radially outwardly from inner surface 67 into fluid communication with one of openings 79-1 and 79-2. As shown, each of openings 79-1 and 79-2 has four passageways 78 associated therewith.

A pair of substantially circular, transverse openings 81-1 and 81-2 are provided in member 65, each of openings 81-1 and 81-2 extending transversely from top surface 71 to bottom surface 73. Openings 81-1 and 81-2 may be used to receive bolts or similar hardware (not shown) to compress a plurality of electrolyzers 11 between a pair of plates (not shown).

A plurality of circumferential sealing ribs 91 for sealing with cathode gasket 23 are provided on bottom surface 73 of member 65, ribs 91 being concentrically arranged in the space between inner surface 67 and openings 75-1 through 75-5, openings 79-1 and 79-2, and openings 81-1 and 81-2. Additional pluralities of concentric ribs for sealing with gasket 23 are provided on bottom surface 73 of member 65, said ribs consisting of ribs 93 surrounding opening 79-1, ribs 95 surrounding opening 79-2, ribs 97 surrounding both opening 75-1 and opening 75-2, and ribs 99 surrounding all three of openings 75-3 through 75-5. Corresponding pluralities of sealing ribs (not shown) are provided on top surface 71 of member 65.

Anode frame 20 and cathode frame 21 have matching sizes and shapes are oriented relative to one another so that openings 35-1 and 35-2 of anode frame 20 are aligned with openings 75-1 and 75-2, respectively, of cathode frame 21, so that openings 35-3 through 35-5 of anode frame 20 are aligned with openings 75-3 through 75-5, respectively, of cathode frame 21, so that openings 39-1 and 39-2 of anode frame 20 are aligned with openings 79-1 and 79-2, respectively, of cathode frame 21, and so that openings 41-1 and 41-2 of anode frame 20 are aligned with openings 81-1 and 81-2, respectively, of cathode frame 21. This arrangement is repeated where a plurality of electrolyzers 11 are combined in a bipolar stack. In this manner, openings 35-1 through 35-5, openings 75-1 through 75-5, openings 39-1 and 39-2, and openings 79-1 and 79-2 serve as axial ports to fluidly interconnect a number of electrolyzers 11.

In those instances when electrolyzer 11 is operated under anode feed conditions, water is supplied to openings 35-1 and 35-2 of anode frame 20, where at least a portion of said water is conducted from openings 35-1 and 35-2 through radial passageways 37 to the anode side of membrane electrode assembly 12. The oxygen gas produced on the anode side of membrane electrode assembly 12, together with excess water, is conducted away from membrane electrode assembly 12 through radial passageways 37 leading to openings 35-3 through 35-5 of anode frame 20. The hydrogen gas produced on the cathode side of membrane electrode assembly 12 is conducted away from membrane electrode assembly 12 through radial passageways 78 leading to openings 79-1 and 79-2. On the other hand, where electrolyzer 11 is operated under cathode feed conditions, water is supplied to opening 79-1 of cathode frame 21, where at least a portion of said water is conducted from opening 79-1 through radial passageways 78 to the cathode side of membrane electrode assembly 12. The hydrogen gas produced on the cathode side of membrane electrode assembly 12, together with excess water, is conducted away from membrane electrode assembly 12 through radial passageways 78 leading to opening 79-2 of cathode frame 22. The oxygen gas produced on the anode side of membrane electrode assembly 12 is conducted away from membrane electrode assembly 12 through radial passageways 37 leading to openings 35-1 through 35-5.

As can be appreciated, because electrolyzer 11 is designed for anode flow, the number of passageways in anode frame 20 is tailored to match gas and water flow to control pressure drop within anode frame 20. However, when coolant flow is moved to the cathode side, more water will pass through a smaller number of ports and will result in a high pressure drop in the frame porting region of the coolant loop.

SUMMARY OF THE INVENTION

It is an object of the present invention to provide a novel cell frame for an electrochemical cell, such as a water electrolyzer.

It is another object of the present invention to provide a cell frame for an electrochemical cell, such as a water electrolyzer, that is generic for use as an anode cell frame and as a cathode cell frame.

It is still another object of the present invention to address at least some of the disadvantages associated with conventional cell frames.

It is still yet another object of the present invention to provide a standardized universal frame that can be used for the containment of anode or cathode components and that is capable of operating, without internal modification, in anode feed or cathode feed configurations. This simplifies (1) the frame design process, (2) mold design, fabrication—and, hence, cost, (3) reduces scrap (and cost) since molded parts are symmetric, so temperature and flow within a mold will be more uniform, (4) eases stack assembly, and (5) makes stack tolerances, which are crucial to sealing, less critical than in conventional stacks by distributing non-uniformities.

Therefore, according to one aspect of the invention, there is provided a universal cell frame generic for use as an anode frame and as a cathode frame in a water electrolyzer or other electrochemical cell, said universal cell frame comprising a unitary annular member defining a central opening and having four matching sets of transverse openings, each of the four matching sets of transverse openings being spaced apart by about 90 degrees, two of the four matching sets of transverse openings being spaced apart from one another by about 180 degrees and each being fluidly interconnected with the central opening by at least one internal radial passageway, the remaining two of the four matching sets of transverse openings being spaced apart by about 180 degrees and not being fluidly interconnected with the central opening by an internal radial passageway.

According to a preferred embodiment, the universal cell frame includes a unitary annular member having a central opening. Four trios of transverse openings are provided in the annular member, each trio being spaced, apart by about 90 degrees. A plurality of internal radial passageways fluidly interconnect the central opening and each of the transverse openings of two diametrically-opposed trios of openings, the other two trios of openings lacking corresponding radial passageways. Sealing ribs are provided on the top and bottom surfaces of the annular member.

The present invention is also directed at a water electrolyzer or other electrochemical cell that includes two of the above-described cell frames, one cell frame being used as the anode frame and the other cell frame being used as the cathode frame, the cathode frame being rotated 90 degrees relative to the anode frame.

Additional objects, as well as aspects, features and advantages, of the present invention will be set forth in part in the description which follows, and in part will be obvious from the description or may be learned by practice of the invention. In the description, reference is made to the accompanying drawings which form a part thereof and in which is shown by way of illustration various embodiments for practicing the invention. The embodiments will be described in sufficient detail to enable those skilled in the art to practice the invention, and it is to be understood that other embodiments may be utilized and that structural changes may be made without departing from the scope of the invention. The following detailed description is, therefore, not to be taken in a limiting sense, and the scope of the present invention is best defined by the appended claims.

BRIEF DESCRIPTION OF THE DRAWINGS

The accompanying drawings, which are hereby incorporated into and constitute a part of this specification, illustrate various embodiments of the invention and, together with the description, serve to explain the principles of the invention. In the drawings wherein like reference numerals represent like parts.

DETAILED DESCRIPTION OF PREFERRED EMBODIMENTS

The present invention is directed at a universal cell frame that is generic for use in a water electrolyzer on both the anode side as an anode cell frame and on the cathode side as a cathode cell frame, the universal cell frame simply being placed in a particular rotational orientation depending on whether it is being used as an anode cell frame or as a cathode cell frame. In this manner, the universal cell frame of the present invention obviates the need for differently constructed anode and cathode cell frames. The present invention is also directed at a water electrolyzer that includes a pair of the aforementioned universal cell frames, one of said universal cell frames being used as the anode cell frame and the other of said universal cell frames being used as the cathode cell frame.

Figure 1:
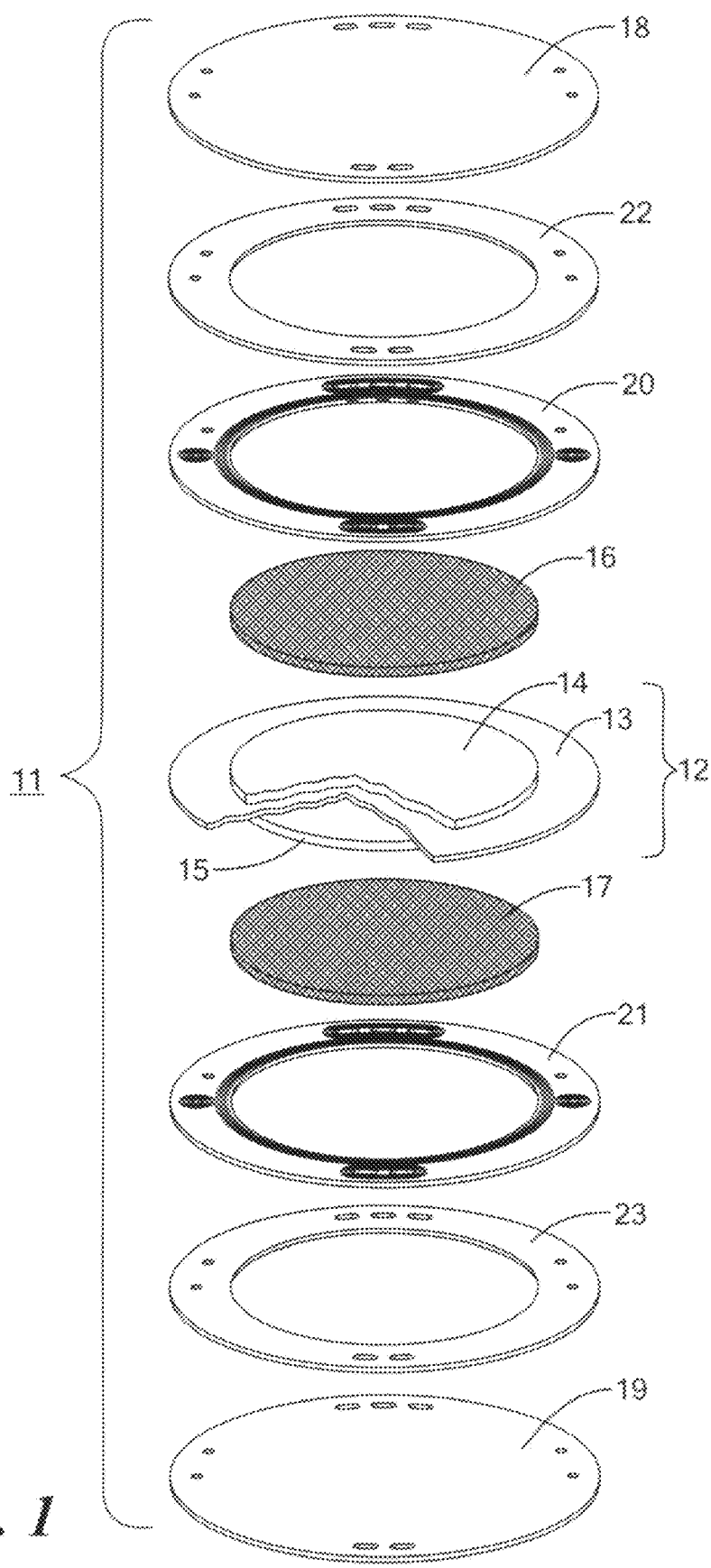
FIG. 1 is a simplified, partially-exploded, perspective view, broken away in part, of a conventional water electrolysis cell.
Figure 2:
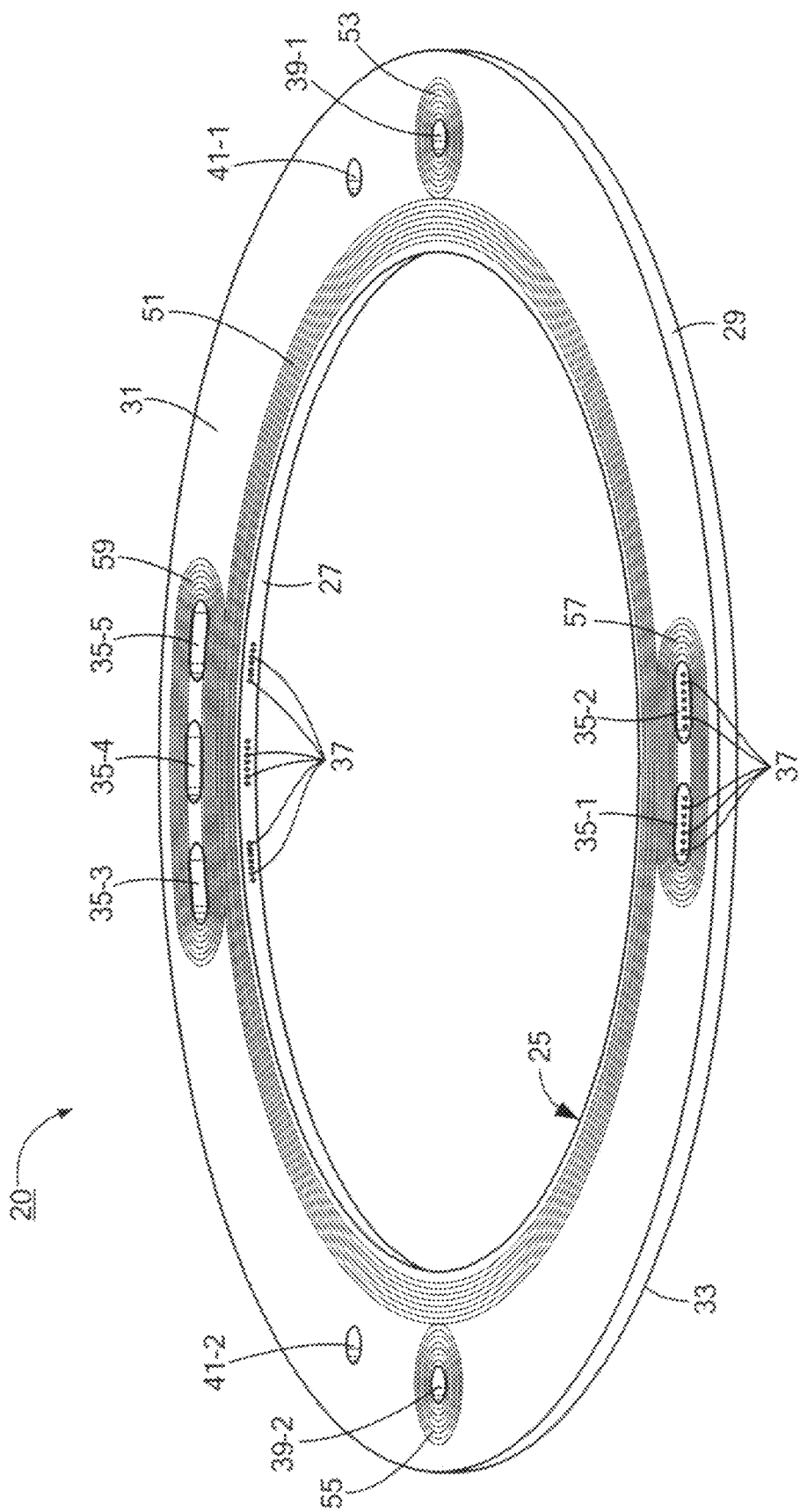
FIG. 2 is a top perspective view of the anode frame shown in FIG. 1.
Figure 3:
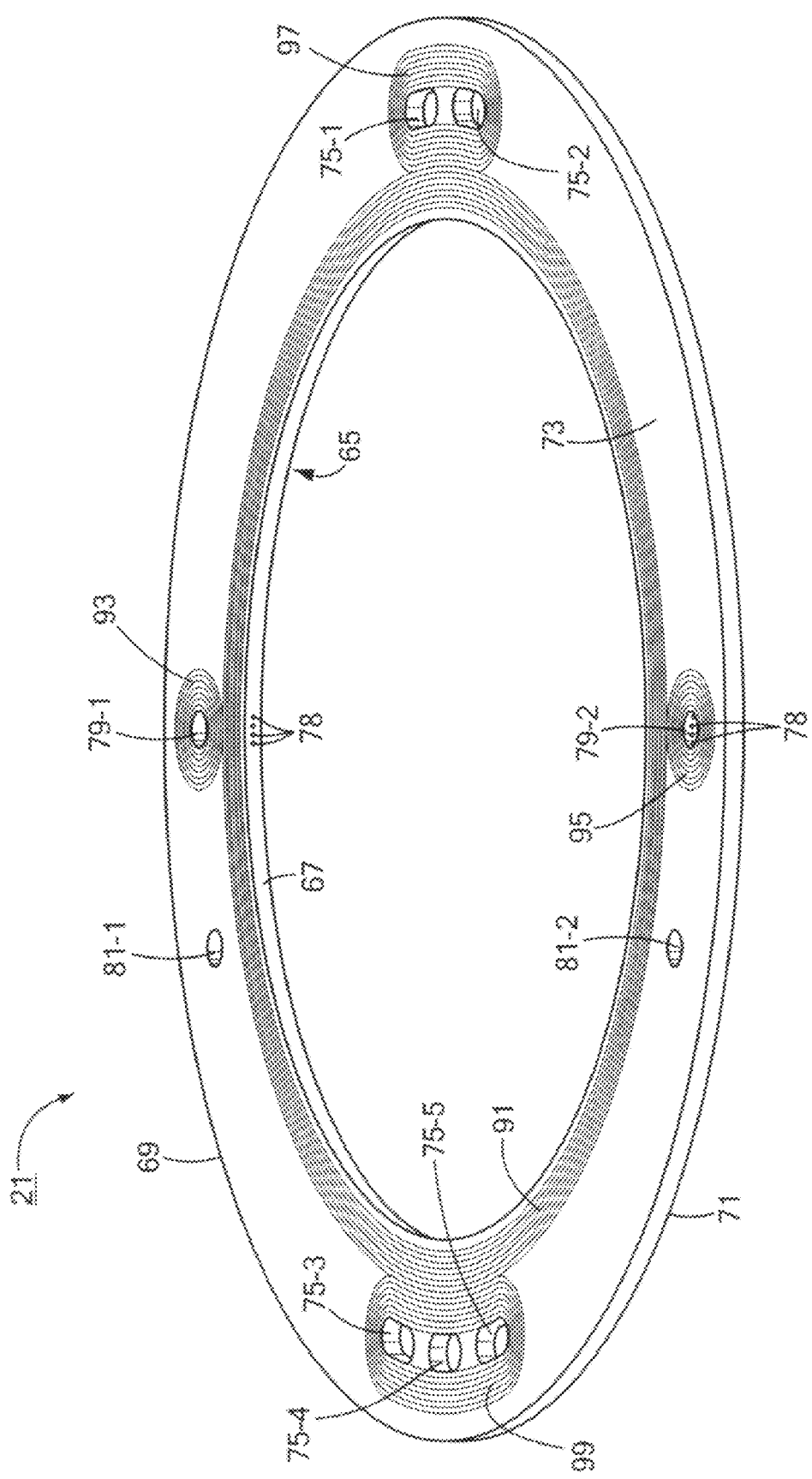
FIG. 3 is a bottom perspective view of the cathode frame shown in FIG. 1.
Figure 4:
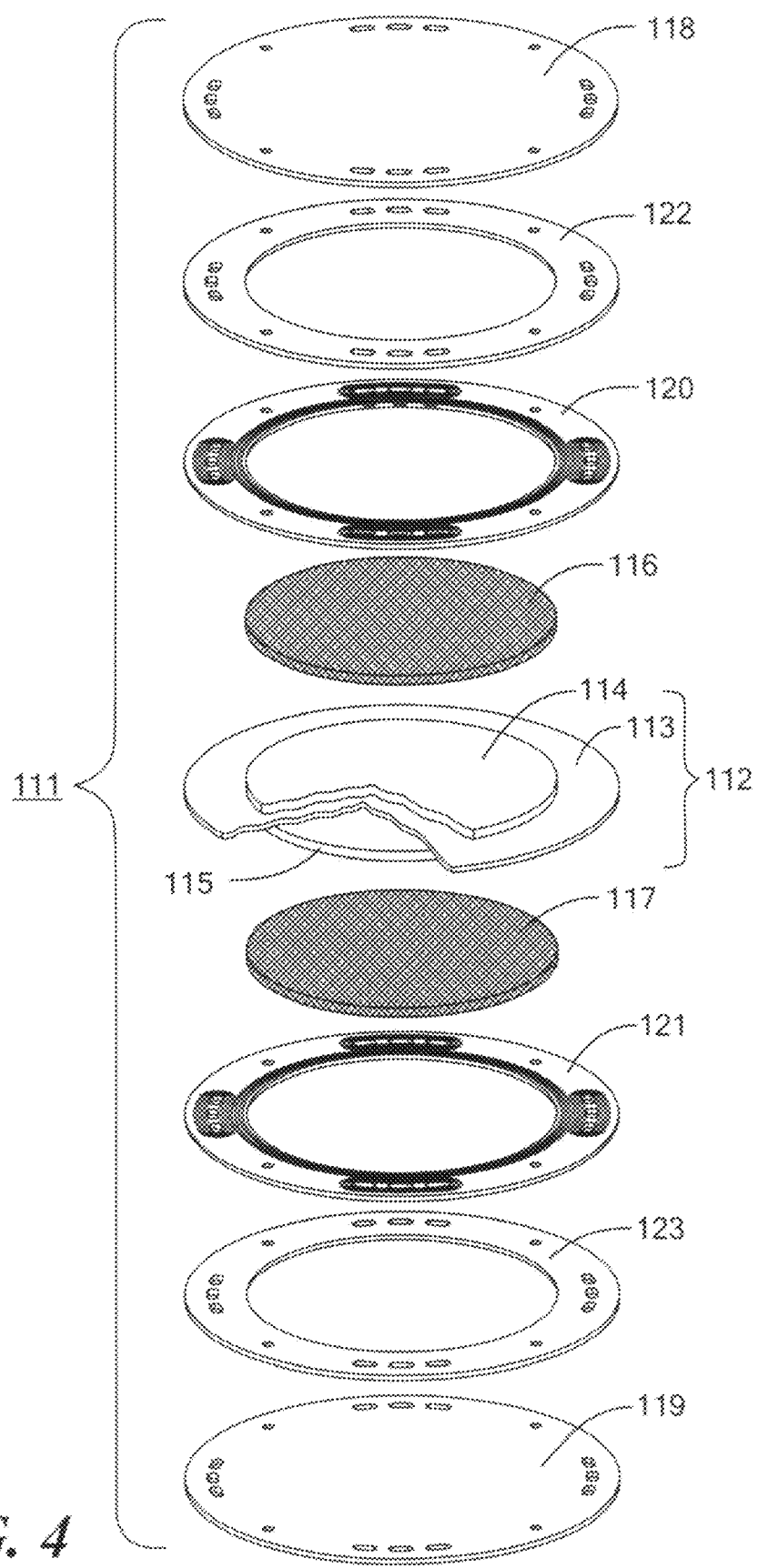
FIG. 4 is a simplified, partially-exploded, perspective view, broken away in part, of one embodiment of an electrolysis cell constructed according to the teachings of the present invention.

Referring now to FIG. 4, there is shown a partially-exploded perspective view of a PEM water electrolyzer (i.e., electrolysis cell) constructed according to the teachings of the present invention, said PEM water electrolyzer being represented generally by reference numeral 111. For the sake of simplicity, certain aspects of PEM water electrolyzer 111 that are not pertinent to the present invention are neither shown nor discussed herein.

Electrolyzer 111 comprises a membrane electrode assembly 112, membrane electrode assembly 112 comprising a polymer electrolyte membrane (PEM) 113, an anode 114 positioned along one face of PEM 113, and a cathode 115 positioned along the opposite face of PEM 113. Electrolyzer 111 further comprises an anode screen 116 (or other means for defining a porous anodic fluid cavity) in contact with the outer face of anode 114, a cathode screen 117 (or other means for defining a porous cathodic fluid cavity) in contact with the outer face of cathode 115, an anode separator 118 positioned against the outer face of anode screen 116, a cathode separator 119 positioned against the outer face of cathode screen 117, an anode frame 120, a cathode frame 121, an anode gasket 122, and a cathode gasket 123.

Anode frame 120 and cathode frame 121 are identical to one another in construction, the only difference between the two frames being that cathode frame 121 is rotated about its center by 90 degrees relative to anode frame 120. Consequently, the discussion below regarding the construction of anode frame 120 is equally applicable to cathode frame 121.

Figure 5:
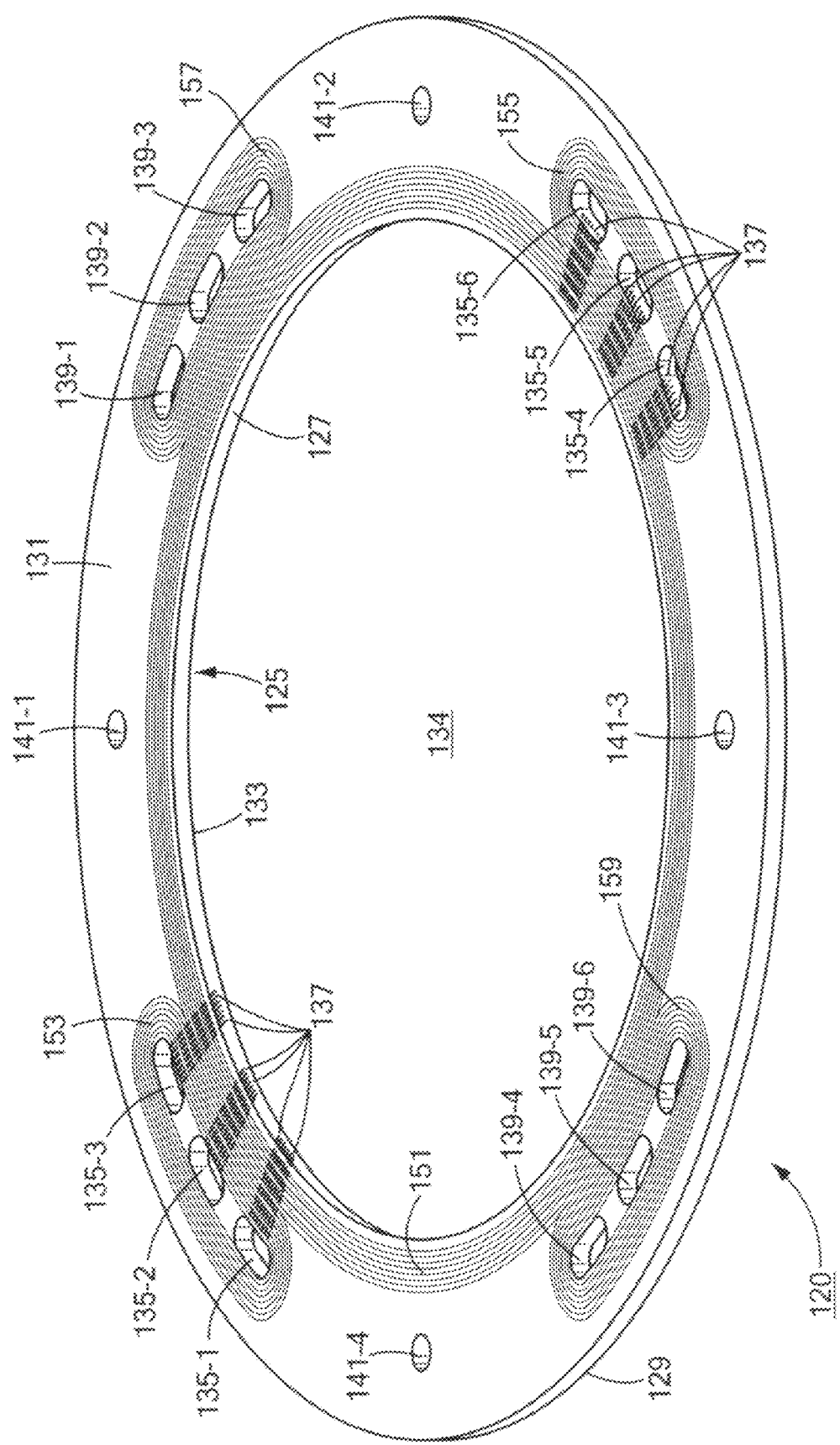
FIG. 5 is a top perspective view of the anode cell frame shown in FIG. 4, the cathode cell frame being identical in construction thereto but rotated 90 degrees relative thereto.
Figure 6:
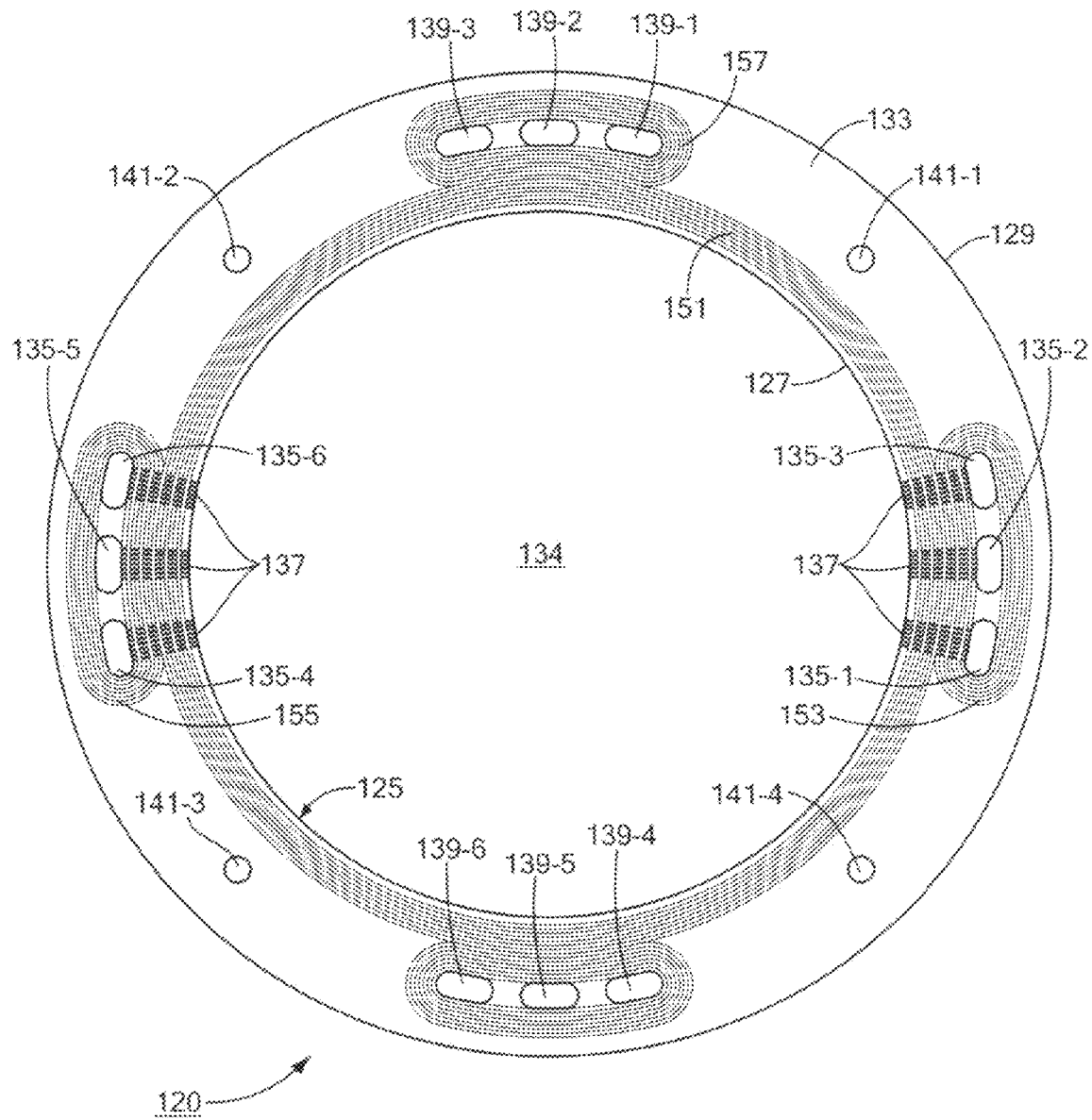
FIG. 6 is a bottom view of the anode cell frame shown in FIG. 5, with the radial passageways of the cell frame being shown in phantom.

Anode frame 120, which is also shown separately in FIGS. 5 and 6, comprises a unitary annular member 125. Member 125 may be made from one or more suitable plastics, metals, ceramics or other high-strength thin film material. Examples of suitable plastics include polysulfone, polyethersulfone, polyphenylene, polyphenylene sulfide, polyphenylene oxide, polybenzimidazole and other liquid-crystal polymers. Examples of suitable metals include titanium, zirconium, and niobium. Member 125 comprises an inner surface 127, an outer surface 129, a top surface 131, and a bottom surface 133 and defines a central opening 134. A first trio of closely-spaced, substantially elliptical, transverse openings 135-1, 135-2 and 135-3 are provided in member 125, each of openings 135-1 through 135-3 extending transversely from top surface 131 to bottom surface 133. In addition, a second trio of closely-spaced, substantially elliptical, transverse openings 135-4, 135-5 and 135-6 are provided in member 125, each of openings 135-4 through 135-6 extending transversely from top surface 131 to bottom surface 133. Openings 135-4 through 135-6 are positioned in a substantially diametrically-opposed manner relative to openings 135-1 through 135-3, i.e., openings 135-4 through 135-6 are positioned approximately 180 degrees away from openings 135-1 through 135-3. A plurality of radial passageways 137 are provided in member 125, each radial passageway 137 extending radially outwardly from inner surface 127 into fluid communication with one of openings 135-1 through 135-6. As shown, each of openings 135-1 through 135-6 has seven passageways 137 associated therewith; however, the number of passageways 137 associated with each of openings 135-1 through 135-6 may be greater than or less than seven. Moreover, while it is desirable that the total number of passageways 137 associated with openings 135-1 through 135-3 be equal to the total number of passageways 137 associated with openings 135-4 through 135-6, it should be understood that equal numbers of passageways 137 need not be present in each of openings 135-1 through 135-6.

A third trio of closely-spaced, substantially elliptical, transverse openings 139-1 through 139-3 and a fourth trio of closely-spaced, substantially elliptical, transverse openings 139-4 through 139-6 are provided in member 125, each of openings 139-1 through 139-6 extending transversely from top surface 131 to bottom surface 133. Transverse openings 139-1 through 139-3 are positioned approximately 180 degrees away from transverse openings 139-4 through 139-6. In addition, each of transverse openings 139-1 through 139-6 is positioned approximately 90 degrees away from openings 135-1 through 135-3 and approximately 90 degrees away from openings 135-4 through 135-6.

It should be understood that, although frame 120 includes trios of elliptical transverse openings, the present invention is not limited to trios of openings nor is the present invention limited to elliptical openings. Accordingly, the number of openings and the shape of such openings may be varied.

A plurality of substantially circular, transverse openings 141-1 through 141-4 are provided in member 125, each of openings 141-1 through 141-4 extending transversely from top surface 131 to bottom surface 133. Openings 141-1 through 141-4 may be used to receive bolts or similar hardware (not shown) to compress a bipolar stack of electrolyzers 111 between a pair of plates (not shown).

A plurality of circumferential sealing ribs 151 for sealing with anode gasket 122 are provided on top surface 131 of member 125, ribs 151 being concentrically arranged in the space between inner surface 127 and openings 135-1 through 135-6, openings 139-1 through 139-6, and openings 141-1 through 141-4. Additional pluralities of concentric ribs for sealing with gasket 122 are provided on top surface 131 of member 125, said ribs consisting of ribs 153 surrounding all three of openings 135-1 through 135-3, ribs 155 surrounding all three of openings 135-4 through 135-6, ribs 157 surrounding all three of openings 139-1 through 139-3, and ribs 159 surrounding all three of openings 139-4 through 139-6. Corresponding pluralities of sealing ribs (not shown) are provided on bottom surface 133 of member 125.

Anode frame 120 may be made by molding the ribbed and ported annular structure, with passageways 137 being machined thereafter. Anode frame 120 preferably has a thickness in the range of about 0.020-0.090 inch and preferably has a central opening 134 in the range of about 50 cm$^2$-300 cm$^2$ or larger.

As noted above, anode frame 120 and cathode frame 121 are identical to one another in construction and are simply rotated 90 degrees relative to one another. Consequently, openings 135-1 through 135-6 of anode frame 120 are aligned with openings 139-1 through 139-6, respectively, of cathode frame 121, and openings 139-1 through 139-6 of anode frame 120 are aligned with openings 135-1 through 135-6, respectively, of cathode frame 121. This arrangement is repeated where a plurality of electrolyzers 111 are combined in a bipolar stack. In this manner, openings 135-1 through 135-6 and openings 139-1 through 139-6 serve as axial ports to fluidly interconnect a number of electrolyzers 111.

Electrolyzer 111 can be operated under liquid-water anode or cathode, as well as water-vapor anode or cathode, feed conditions, and can even change from anode to cathode feed operation without internal modification. The universal frame of the present invention reduces design time, simplifies moldmaking, and enhances the probability of an acceptable molded product—be it compression molded or injection molded. The invention also standardizes post-molding machining operations, simplifies stack assembly, and yields frames that are less sensitive to electrolyzer buildup tolerance variations than are conventional frames.

In those instances when electrolyzer 111 is operated under anode feed conditions, water is supplied to openings 135-1 through 135-3 of anode frame 120, where at least a portion of said water is conducted from openings 135-1 through 135-3 through radial passageways 137 to the anode side of membrane electrode assembly 112. The oxygen gas produced on the anode side of membrane electrode assembly 112, together with excess water, is conducted away from membrane electrode assembly 112 through radial passageways 137 leading to openings 135-4 through 135-6 of anode frame 120. The hydrogen gas produced on the cathode side of membrane electrode assembly 112 is conducted away from membrane electrode assembly 112 through radial passageways 137 leading to openings 135-1 through 135-6. On the other hand, in those instances when electrolyzer 111 is operated under cathode feed conditions, water is supplied to openings 135-1 through 135-3 of cathode frame 121, where at least a portion of said water is conducted from openings 135-1 through 135-3 through radial passageways 137 to the cathode side of membrane electrode assembly 112. The hydrogen gas produced on the cathode side of membrane electrode assembly 112, together with excess water, is conducted away from membrane electrode assembly 112 through radial passageways 137 leading to openings 135-4 through 135-6 of cathode frame 122. The oxygen gas produced on the anode side of membrane electrode assembly 112 is conducted away from membrane electrode assembly 112 through radial passageways 137 leading to openings 135-6 through 135-6.

In contrast to electrolyzer 11, because of the symmetry and identical structure of the anode and cathode frames of electrolyzer 111, electrolyzer 111 experiences a coolant flow pressure drop in the port region of the universal frame that is nearly the same in anode feed or cathode feed conditions.

Moreover, the symmetry of the universal frame of the present invention makes the frame easier to design, to mold and to machine. Endplates for use with the frame become correspondingly simple with the universal frame of the present invention. Better quality parts are possible with the universal frame because mold temperatures and resin flow, whether compression molded or injection molded, will be more uniform with a universal frame.

Figure 7A:
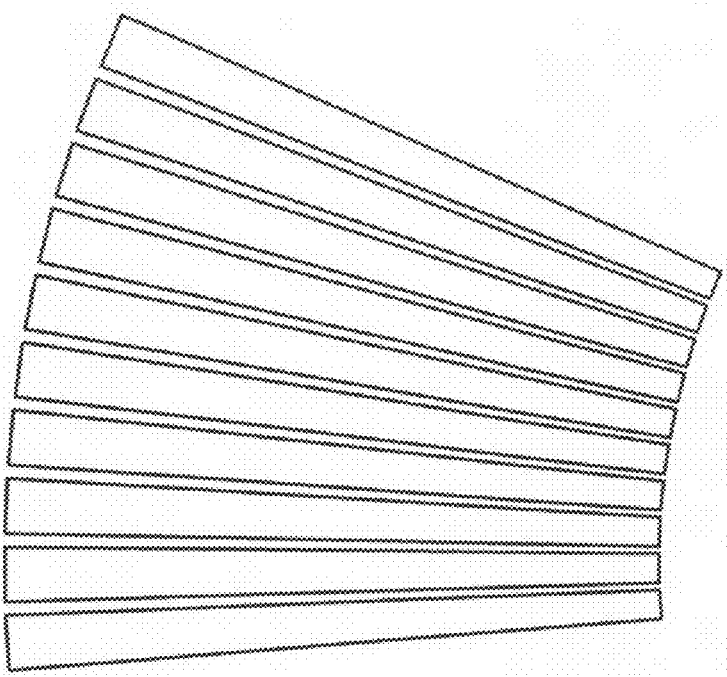
FIGS. 7(a) and 7(b) are simplified schematic side views of a stack of conventional cell frames and a stack of the anode cell frame of FIG. 5, respectively.
Figure 7B:
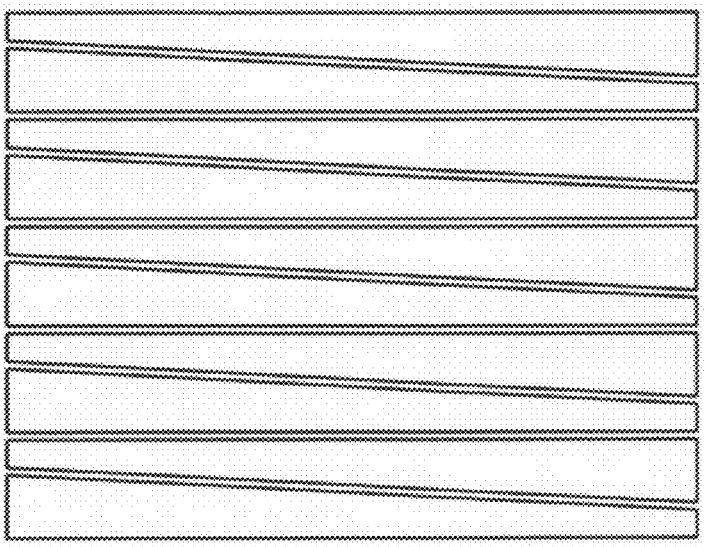

As illustrated in FIGS. 7(a) and 7(b), manufacturing flaws may result in a frame being thicker on one side than on an opposite side. Because conventional frames must be oriented in only one manner, such tolerance errors can have a cumulative effect in a stack (see FIG. 7(a)). By comparison, the universal frame of the present invention may be oriented in ways that permit thick and thin regions to cancel each other out, thereby resulting in a more uniform stack (see FIG. 7(b)).

Figure 8:
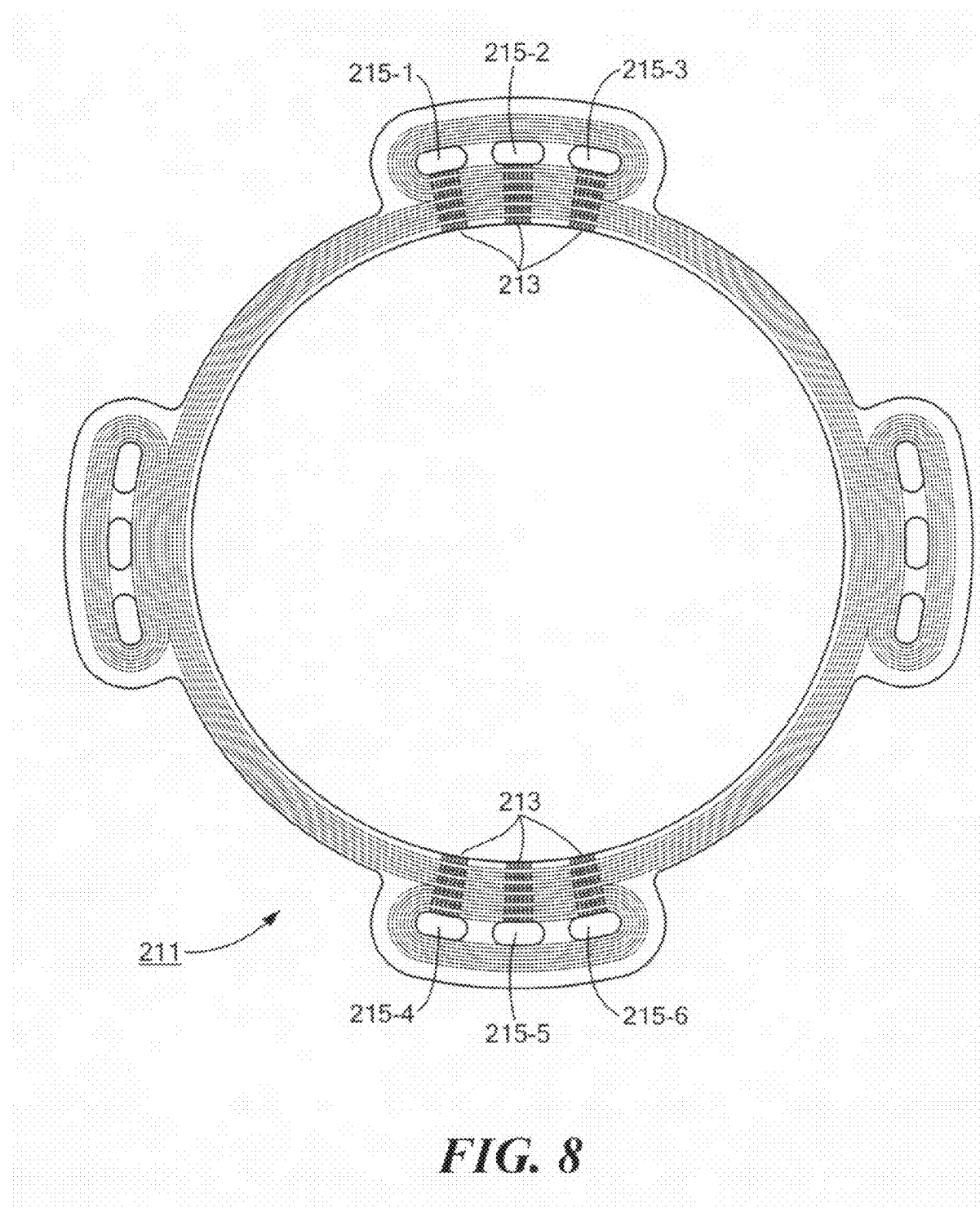
FIG. 8 is a top view of an alternate embodiment of a universal cell frame to that shown in FIG. 5, with the radial passageways of the cell frame being shown in phantom.

An alternate embodiment of a universal cell frame adapted for use in electrolyzer 111 in accordance with the teachings of the present invention is shown in FIG. 8, said universal cell frame being represented generally by reference numeral 211. Cell frame 211 is similar in most respects to frame 111, a principal difference between the two frames being that cell frame 211 omits some of the material located in the areas between adjacent ribs 153, 155, 157 and 159 and positioned radially outwardly relative to ribs 151, 153, 155, 157 and 159. Another difference between cell frame 211 and frame 111 is that, whereas frame 111 has seven radial passageways 137 associated with each of openings 135-1 through 135-6, frame 211 has five radial passageways 213 associated with each of openings 215-1 through 215-6.

The examples below are illustrative only and do not limit the present invention.

EXAMPLE 1

Proof-of Concept Testing in Two-Part Welded Frame, Electrolyzer Cell

Testing was conducted on a two-part ultrasonically welded frame that featured four symmetric clusters of three axial through slots that characterize the universal frame. Axial porting and the symmetric clusters of uniform slots performed well on the anode, low-pressure side of the cell when electrochemically tested in an electrolysis cell with an active cell area of 160 $cm^2$ at 60 psi, 700 $mA/cm^2$.

EXAMPLE 2

Durability Testing in an Electrolyzer Short Stack under Cathode Feed Conditions

A three-cell short stack with an active cell area of 160 $cm^2$/cell was built with universal frames on both the anode and cathode sides of the cells, NAFION N117 membranes and plumbed for cathode feed operation. The stack ran successfully for over 500 hours. Testing was performed at 80° C., 1200 psi balanced pressure (1200 psi Oxygen and Hydrogen), and a current density of 700 $mA/cm^2$ with a cell voltage of 1.683.

EXAMPLE 3

Durability Testing in an Electrolyzer Short Stack under Anode Feed Conditions

A three-cell short stack with an active cell area of 160 $cm^2$/cell was built with universal frames on the anode and cathode sides, NAFION N117 membranes and plumbed for anode feed operation. The stack ran successfully for over 500 hours. Testing was performed at 80° C., 1200 psi balanced pressure (1200 psi Oxygen and Hydrogen), and a current density of 700 $mA/cm^2$ with a cell voltage of 1.654.

It is to be understood that the principles of the present invention are not limited to cell frames for PEM water electrolyzers and could also be applied to cell frames for other electrochemical cells, such as, but not limited to, fuel cells.

The embodiments of the present invention described above are intended to be merely exemplary and those skilled in the art shall be able to make numerous variations and modifications to it without departing from the spirit of the present invention. All such variations and modifications are intended to be within the scope of the present invention as defined in the appended claims.

What is claimed is:

1. A universal cell frame generic for use as an anode frame and as a cathode frame in a water electrolyzer, said universal cell frame comprising a unitary annular member defining a central opening and comprising four matching sets of transverse openings, each of the four matching sets of transverse openings comprising a plurality of transverse openings, each of the four matching sets of transverse openings being spaced apart by about 90 degrees, two of the four matching sets of transverse openings being spaced apart from one another by about 180 degrees and each being fluidly interconnected with the central opening by at least one internal radial passageway, the remaining two of the four matching sets of transverse openings being spaced apart by about 180 degrees and not being fluidly interconnected with the central opening by an internal radial passageway.

2. The universal cell frame as claimed in claim 1 wherein each of the four matching sets of transverse openings comprises exactly three transverse openings.

3. The universal cell frame as claimed in claim 1 wherein each of the four matching sets of transverse openings comprises elliptical transverse openings.

4. The universal cell frame as claimed in claim 1 wherein each of the four matching sets of transverse openings comprises exactly three elliptical transverse openings.

5. The universal cell frame as claimed in claim 1 wherein each of the transverse openings of the two matching sets of transverse openings fluidly interconnected with the central opening is fluidly interconnected to the central opening by a plurality of internal radial passageways.

6. The universal cell frame as claimed in claim 1 wherein each of the transverse openings of the two matching sets of transverse openings fluidly interconnected with the central opening is fluidly interconnected to the central opening by five internal radial passageways.

7. The universal cell frame as claimed in claim 6 wherein each of the four matching sets of transverse openings comprises exactly three elliptical transverse openings.

8. The universal cell frame as claimed in claim 1 wherein each of the transverse openings of the two matching sets of transverse openings fluidly interconnected with the central opening is fluidly interconnected to the central opening by seven internal radial passageways.

9. The universal cell frame as claimed in claim 8 wherein each of the four matching sets of transverse openings comprises exactly three elliptical transverse openings.

10. The universal cell frame as claimed in claim 1 wherein said unitary annular member has a top surface and a bottom surface and wherein at least one of said top surface and said bottom surface is provided with at least one sealing rib.

11. The universal cell frame as claimed in claim 1 wherein said unitary annular member has a top surface and a bottom surface and wherein each of said top surface and said bottom surface is provided with at least one sealing rib.

12. The universal cell frame as claimed in claim 1 wherein said unitary annular member is made of polysulfone.

13. An electrochemical cell, said electrochemical cell comprising:
(a) a polymer electrolyte membrane, the polymer electrolyte membrane having a pair of opposing faces;
(b) an anode coupled to one of the opposing faces of the polymer electrolyte membrane;
(c) a cathode coupled to the other of the opposing faces of the polymer electrolyte membrane;
(d) means, in contact with the outer face of the anode, for defining a porous anodic fluid cavity;
(e) means, in contact with the outer face of the cathode, for defining a porous cathodic fluid cavity;
(f) means for axially containing fluid in said porous anodic fluid cavity;
(g) means for axially containing fluid in said porous cathodic fluid cavity;
(h) an anode frame; and
(i) a cathode frame;
(j) wherein said anode frame and said cathode frame are identical in construction, said cathode frame being rotated relative to said anode frame, each of said anode frame and said cathode frame comprising a universal cell frame, said universal cell frame comprising a unitary annular member defining a central opening and comprising four matching sets of transverse openings, each of the four matching sets of transverse openings comprising a plurality of transverse openings, each of the four matching sets of transverse openings being spaced apart by about 90 degrees, two of the four matching sets of transverse openings being spaced apart from one another by about 180 degrees and each being fluidly interconnected with the central opening by at least one internal radial passageway, the remaining two of the four matching sets of transverse openings being spaced apart by about 180 degrees and not being fluidly interconnected with the central opening by an internal radial passageway.

14. The electrochemical cell as claimed in claim 13 wherein said electrochemical cell is a water electrolyzer.

15. The electrochemical cell as claimed in claim 13 wherein each of the four matching sets of transverse openings comprises exactly three transverse openings.

16. The electrochemical cell as claimed in claim 13 wherein each of the four matching sets of transverse openings comprises elliptical transverse openings.

17. The electrochemical cell as claimed in claim 13 wherein each of the four matching sets of transverse openings comprises exactly three elliptical transverse openings.

18. The electrochemical cell as claimed in claim 13 wherein each of the transverse openings of the two matching sets of transverse openings fluidly interconnected with the central opening is fluidly interconnected to the central opening by a plurality of internal radial passageways.

19. The electrochemical cell as claimed in claim 13 wherein each of the transverse openings of the two matching sets of transverse openings fluidly interconnected with the central opening is fluidly interconnected to the central opening by five internal radial passageways.

20. The electrochemical cell as claimed in claim 19 wherein each of the four matching sets of transverse openings comprises exactly three elliptical transverse openings.

21. The electrochemical cell as claimed in claim 13 wherein each of the transverse openings of the two matching sets of transverse openings fluidly interconnected with the central opening is fluidly interconnected to the central opening by seven internal radial passageways.

22. The electrochemical cell as claimed in claim 21 wherein each of the four matching sets of transverse openings comprises exactly three elliptical transverse openings.

23. The electrochemical cell as claimed in claim 13 wherein said unitary annular member has a top surface and a bottom surface and wherein at least one of said top surface and said bottom surface is provided with at least one sealing rib.

24. The electrochemical cell as claimed in claim 13 wherein said unitary annular member has a top surface and a bottom surface and wherein each of said top surface and said bottom surface is provided with at least one sealing rib.

* * * * *